Patented Dec. 10, 1946

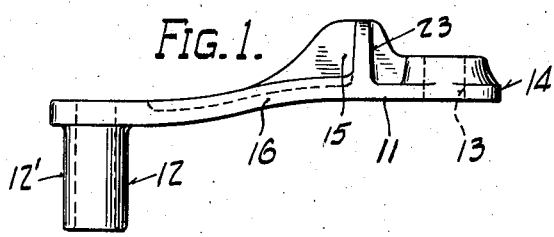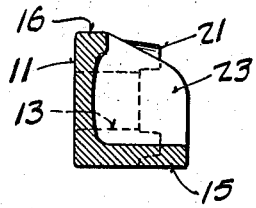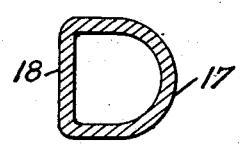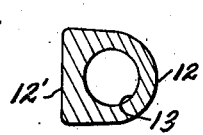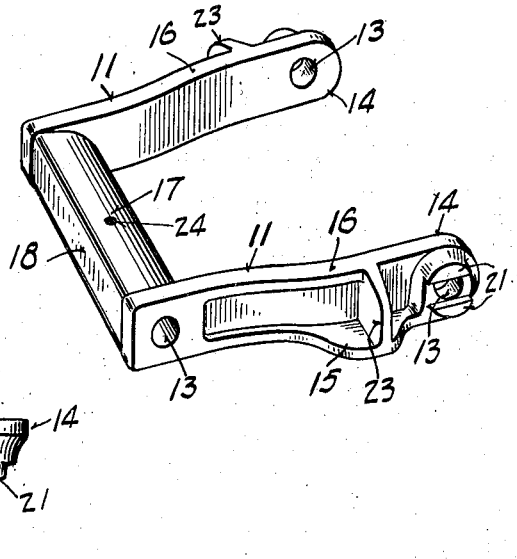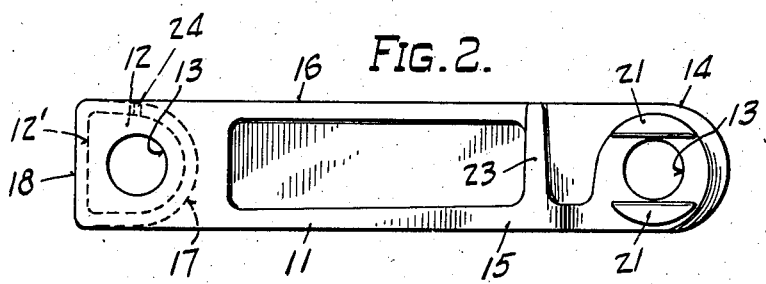

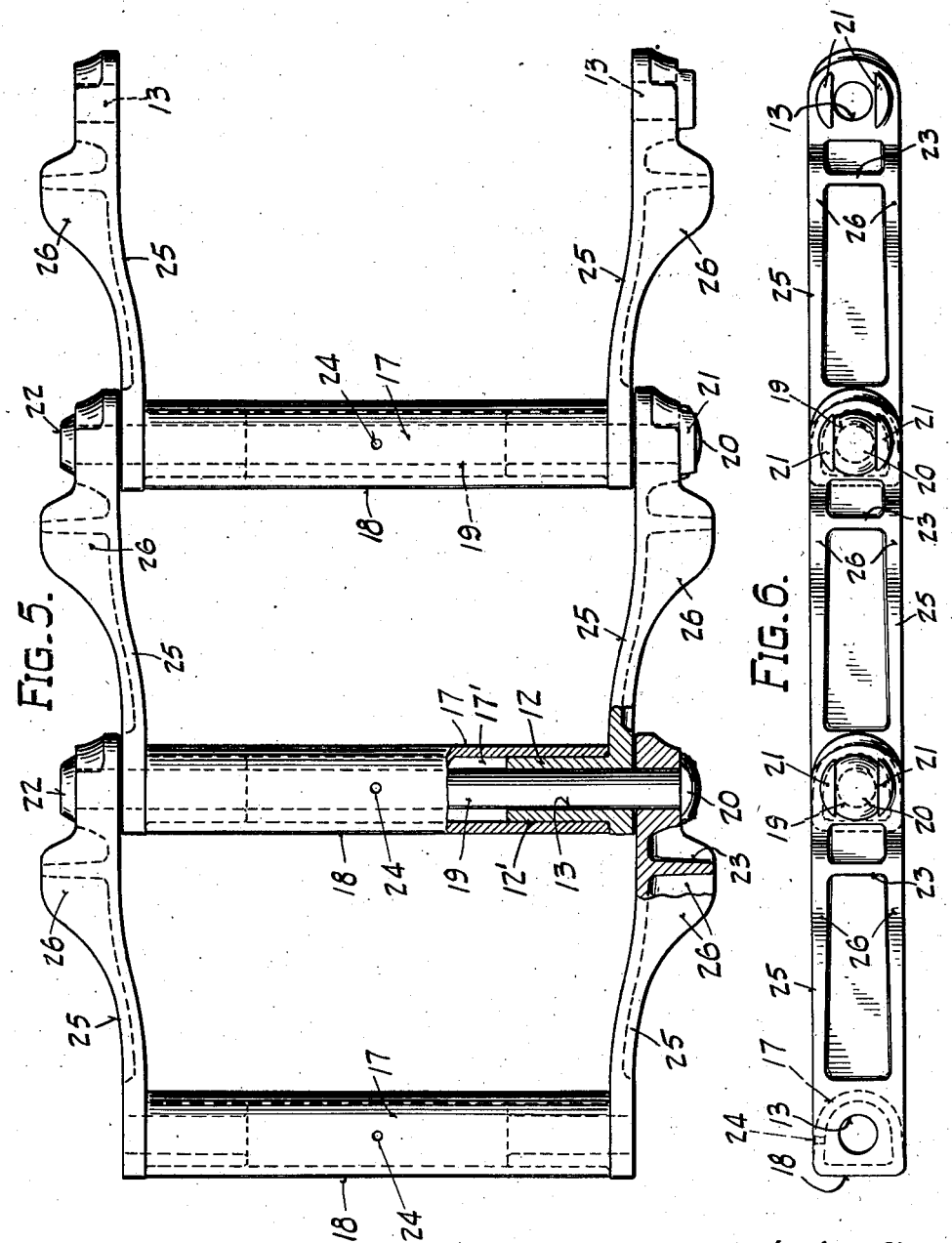

2,412,364

UNITED STATES PATENT OFFICE 2,412,364

CHAIN LINK CONSTRUCTION

Benjamin E. Sivyer, Whitefish Bay, Wis., assignor to Chain Belt Company, Milwaukee, Wis., a corporation of Wisconsin Application September 18, 1944, Serial No. 554,660

5 Claims. (Cl. 198—172)

This invention relates to chains and especially chains of the type used for conveying material along flat surfaces. Quite frequently these chains operate in shallow troughs and when so used, they serve in themselves and without any attachment or flights, as a conveying medium for saw dust, refuse and similar material.

It is an object of the present invention to provide a chain suitable for the uses heretofore mentioned and possibly others, which can be manufactured in a more economical manner than similar chains heretofore employed. Another object of the invention is to provide a chain link of such construction that the edges of the side portions thereof may each be provided with a wearing shoe so that the edge which slides on the chain support during the return run of the chain may be protected as well as the edge which slides in the trough or runway on the carrying side. In fact the wearing shoes on the two edges may be made symmetrical so that the link may be transposed to compensate for the fact that wear is usually greater on the edge which contacts the support on the carrying run.

A further object of the invention is to provide a chain side bar and also a transverse connecting member such that the side bars may be connected together by the transverse member and by using connecting members of different lengths, the width of the chain may be varied without requiring any change in the side bar construction.

These and other objects are accomplished through the provision of a chain link having cast or forged side bars with projections integrally cast or formed on the inner side of each and extending a substantial distance toward each other in line with the chain joint. The two side bars are joined together by means of a hollow tubular member which is fitted over the ends of the projections to form a unit link. Apertures extend through the projection of each side bar and form bearings for the rivet or pin of the adjacent link.

Two illustrations of the invention are shown in the accompanying drawings wherein:

Figure 1 is a plan view of the two side bars and the connecting tubular member prior to assembly;

Figure 2 is a side view of a link formed from the members shown in Figure 1;

Figure 3 is a section taken on the line 3—3 of Figure 1;

Figure 4 is a perspective view of a completed link;

Figure 5 is a plan view of several connected links embodying features of the present invention but slightly modified as to the side bar construction; and Figure 6 is a side elevation of the links shown in Figure 5;

Fig. 7 is a sectional view of the tubular member taken along the line 7—7;

Fig. 8 is a sectional view of the rod-like projection taken on the line 8—8.

In the drawings the numeral 11 designates the cast side bars of the chain which is illustrated in the embodiment shown in Figure 1. Since the two side bars are in the main symmetrical, only one will be described in detail although it will be appreciated that separate patterns will have to be employed for each of the two side bars since in the arrangement illustrated in Figures 1 to 4 inclusive, the complete wearing shoe is provided on only one edge of the side bar and a special rivet head lock is provided on one side, as will be subsequently explained.

Side bar 11 is provided with an integrally cast substantially D shaped projection 12 extending from its inner side in a direction at right angles to the side bar. A flat face 12' is provided on the outer surface of the otherwise round projection preferably on the forward side thereof. Projection 12 and side bar 11 are apertured as at 13 to provide a journal for the rivet which connects the link to an adjacent link of the chain and the side bar 11 is of offset construction so that at the wider end 14 the side bars may enclose the narrow end of an adjacent link. A heavy wearing shoe 15 is cast as an extension of the edge which contacts the supporting surface of the chain when it is on its carrying run. A wearing surface 16 is also provided on the opposite edge, the medial portion of the side bar being of reduced section in order to reduce the weight of the link.

For connecting the two side bars there is provided a tubular member 17 of substantially D shaped cross section having a flat face 18 on its exterior forward side adapted to act as a scraper and convey material in its path. The rear side of the tubular member is round and provides a surface for engagement with sprockets over which the chain travels. In forming the tubular member, a flat surface is provided on its inner surface which may be registered with the flat surfaces 12' on the forward sides of the projections 12.

The tubular connecting member 17 may for instance be formed from steel pipe with its inner surface conforming very closely to the outer surface of the projections 12 previously described. The tubular member may be forced over the projections (the flat portions being in registry) and connected to them in various ways such as by heating and shrinking, by grazing them together, or otherwise. The ends of the tubular member are preferably chamfered to accommodate the fillet at the juncture of the projection 12 and the side bar 11. When assembled, the ends of the tubular member abut the side bars and completely enclose the projections. Any tendency of the tubes 17 to turn relative to the side bars is prevented by the flats 12' locking with the flat portion on the inside of the tube.

As previously mentioned, the links are arranged in overlapping relation, and they are connected by a rivet 19 (see Figure 5) which has a T-shaped head 20 at one end adapted to engage and be held from turning by a head lock 21 closely confining the head of the rivet. The opposite end of the rivet may be threaded and then a nut secured thereto, or as shown it may be riveted as at 22 so as to prevent end displacement of the rivet. To protect the rivet ends, vertical lugs 23 extend outwardly from the side bars just in front of the rivet head locks, the width of these lugs being approximately the same as the width of the wearing shoe.

It will be seen that when the rivet 19 is inserted through the apertures 13 at the open end of the link and also through the barrel portion formed by the assembled tube 17 and projections 12, a bearing is provided for the rivet in each of the projections, but there is considerable space between the inside of the tubular member 17 and the rivet and between the opposing ends of the projections. This space designated 17' may be utilized as a grease reservoir in which event tubular member 17 is drilled as at 24 to permit replenishment of lubricant.

One of the principal advantages of the present invention is that the side bars may be cast while lying flat in the mold, the projections 12 extending vertically either upwardly or downwardly. The present practice in casting links with the barrel or connecting portion integral with the side bars is to place the pattern flat in the mold with the parting line running through the link. It is very difficult and expensive to provide cores so as to reduce the thickness in the central portion of the side bar, and as a result the usual practice is to provide draft from the wearing side to the other edge. When the side bars are separately cast however, it is possible without the use of cores to reduce the center section of the link, as illustrated in Figure 3, and have a wearing shoe on each edge. It is also possible, without the necessity of cores, to cast the manufacturer's mark and the number of the chain on the recessed portion of the outer side of the side bar since this side lies horizontally in the mold.

The side bars may be cast from malleable iron or other suitable material, or they may be die cast or forged. If made of malleable iron, the projections 12 are generally sufficiently smooth, so that the pipe may be tightly pressed over them without the necessity of any finishing operation on the casting projections. A considerable number of side bars may be cast in one mold, which is a considerable savings, for it reduces the amount of sand necessary to produce a pound of casting, and the type of casting is very simple and economical to produce.

In Figures 5 and 6 there is shown a slightly modified form of side bar construction in which the side bars 25 are provided with wearing shoes 26 on each edge which are equally well adapted to resist wear. As far as the side bars of Figures 5 and 6 are concerned the two side bars of the link may be exactly the same except for the fact that only one side bar is provided with the head lock 21. The links shown in Figures 5 and 6 are slightly heavier than the link described in connection with Figures 1 to 4, inclusive, but they have the advantage that they may be turned upside down in the chain and either edge will wear equally well.

With both forms of the invention, a standard set of side bars may be used with intermediate pipe sections of varying length, so as to produce chains of different widths. This also results in economy of manufacture.

The invention having been described in connection with the foregoing embodiments thereof, what is claimed is:

1. A drag chain link comprising side bars having apertured projections extending toward each other adjacent one end of the link, said projections having aligned flattened portions on their outer surfaces disposed substantially transverse to the plane of the link, and a tubular connecting member made from round stock and flattened on one side, so as to be substantially D shaped, said connecting member enclosing said projections with the flattened portions in registry and the ends of the tubular member abutting the side bars, and said connecting member fixedly connecting the side bars to form a link with the flattened portion disposed to form a transverse scraper surface between the side bars.

2. In a drag chain link an integral cast side bar having the two edges of the side bar which contact the surfaces over which the chain runs wider than the medial portion of said side bar, whereby the wearing life is improved; and having an apertured substantially D shaped rod-like projection on the inner side of said side bar disposed for envelopment by a tubular substantially D shaped cross connecting member, connecting said side bar with the side bar on the other side of the link, whereby any relative movement between the said member and the side bars is prevented.

3. A conveyer chain comprising links, pins connecting said links, each of said links having offset side bars apertured at each end and a transverse tubular connecting member having a flat surface on its forward face for conveying purposes, each side bar having an inwardly extending projection at one end through which the aperture at that end extends, said projections being in alignment and enclosed in rigid relationship by the tubular cross member, the apertures extending through the projections forming bearings for the chain pin of an adjacent link and the apertures at the other end of the link serving as anchors for a chain pin.

4. In a chain link comprising side bars and a tubular connecting member flattened interiorly on one side, and flattened exteriorly on the same side, a cast side bar having apertures at each end and offset in the plane of the links to permit overlapping of adjacent links; the end of the side bar at the narrower end of the link having an inwardly extending projection and a flat on the outer side thereof, arranged to forcibly engage the interiorly flattened and round portions of the connecting member, whereby a strong unitary cross member and link is formed, said link being resistant to forces applied in shear and torsion.

5. In a chain link comprising side bars and a tubular connecting member flattened interiorly on one side and flattened exteriorly on the same side substantially normal to the horizontal, to form a conveying face, a cast side bar having apertures at each end and offset in the plane of the link to permit overlapping of adjacent links, the end of the side bar at the narrower end of the link having an inwardly extending projection and a flat on the outer surface thereof, arranged to register with the interiorly flattened portion of the connecting member to prevent the same from rotatable movement.

BENJAMIN E. SIVYER.